Patented Feb. 20, 1923.

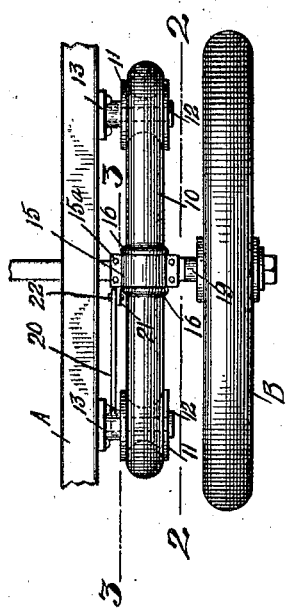
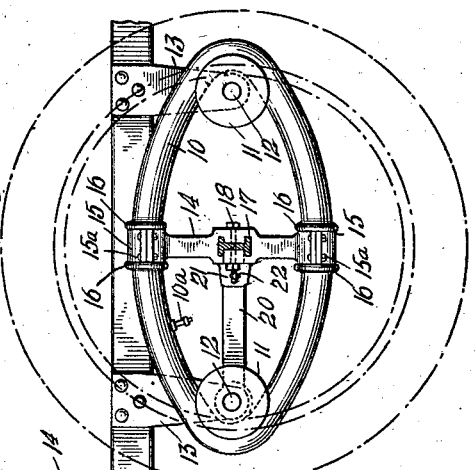
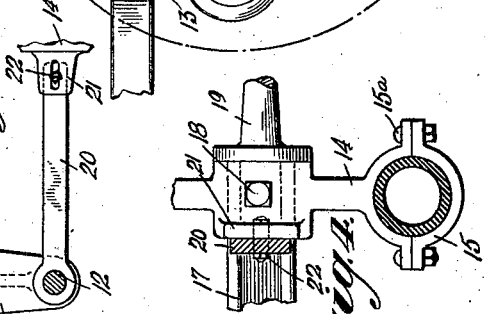
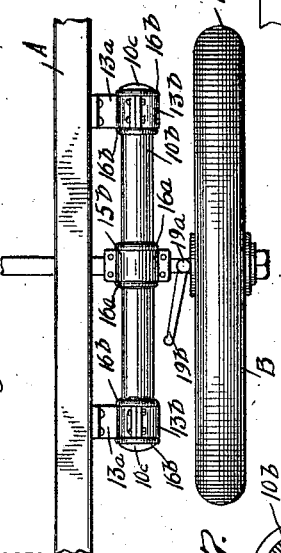
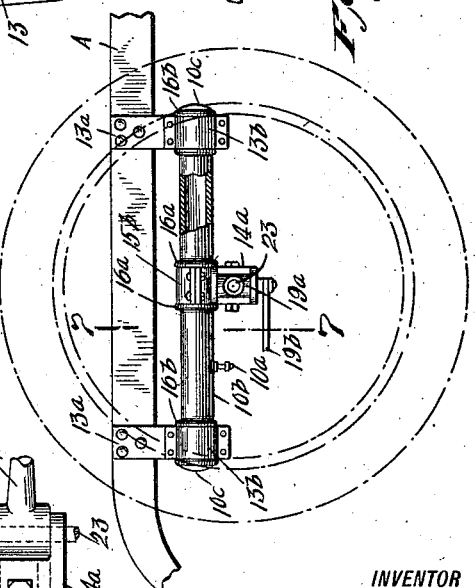
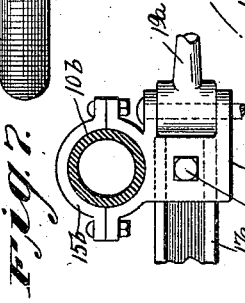

1,445,970

UNITED STATES PATENT OFFICE.

JOHN O'CONNOR, OF NEW YORK, N. Y.

PNEUMATIC SUSPENSION MEANS FOR VEHICLES.

Application filed August 12, 1920. Serial No. 402,960.

*To all whom it may concern:*

Be it known that I, JOHN O'CONNOR, a citizen of the United States, and a resident of the city of New York, borough of Manhattan, in the county of New York and State of New York, have invented a new and Improved Pneumatic Suspension Means for Vehicles, of which the following is a description.

My invention relates to suspension means for automobiles and other vehicles and the general object of the invention is to provide a suspension spring in the form of a pneumatic tube, together with means to mount the spring on the frame of a vehicle and means on the spring to mount the same on an axle.

Reference is to be had to the accompanying drawings forming a part of this specification, it being understood that the drawings are merely illustrative of practical examples of the invention.

Figure 1 is a plan view of a suspension means embodying my invention in one form;

Figure 2 is a longitudinal sectional side elevation, the section being taken on the line 2—2, Figure 1;

Figure 3 is a detail in longitudinal vertical section given to show a brace employed in connection with the axle mount;

Figure 4 is a detail in transverse vertical section, the view being given to better show the clamp means for securing the axle mount to the pneumatic spring;

Figure 5 is a view similar to Figure 1 but showing a modification;

Figure 6 is a side elevation of the invention formed as in Figure 5, a portion of the pneumatic tube being broken away;

Figure 7 is a detail in enlarged transverse vertical section of a pneumatic spring, the plane corresponding with the line 7—7, Figure 6.

Referring at first more particularly to Figures 1 to 4, the elliptic spring 10 is in the form of a pneumatic tube, said tube at the ends extending about rollers 11 loose on transverse pins 12 on hanger brackets 13 riveted or otherwise suitably fastened to a vehicle, a portion of which is indicated at A. The pneumatic tube 10 is disposed with its minor axis vertical and the top and bottom of the spring are connected by a rigid element 14 constituting an axle mount as hereinafter explained. The element 14 in the illustrated example is secured by clamps 15 embracing said tube between pairs of annular beads 16 formed on the exterior of the tube 10 at the top and bottom, the clamps in the illustrated form presenting flanged sections through which bolts $15^a$ pass, permitting the element 14 to readily be removed by removing said bolts.

The axle mount 14 may be secured to the axle in any suitable manner. In the illustrated example the body 17 of the axle is shown in the form of an I-bar the end of the axle being received in said mount and secured to the latter by a transverse bolt 18, there being an axle spindle 19 rigid with the mount 14.

In order that the pull exerted through the axle may not be effective on the pneumatic suspension spring, a brace bar 20 is provided. In the illustrated arrangement the brace 20 is pivotally secured at one end to a fixed part of the chassis, as for example, to one of the pins 12; and the opposite end of said brace 20 is suitably secured to the axle 17 or to the axle mount 14, there being employed in the form shown, a lug 21 on mount 14, said lug having a slot $21^a$ receiving a bolt or pin 22 which passes through the bar 20.

The described axle arrangement is adapted for the rear axle of the vehicle. In Figures 5 and 6 a modification of the spring is shown and as illustrated it is adapted to the front or steering axle. The spring shown in Figures 5 to 7 is in the form of a straight length of pneumatic tube $10^b$ equipped with a tire valve ($10^a$) and having closed ends $10^c$. Hanger brackets $13^a$ suitably fastened to the frame A of the vehicle are provided with clamps $13^b$ of the general form of clamps 15 and engaging the tube $10^b$ between spaced annular ribs $16^b$. The axle mount $14^a$ is secured by a clamp $15^b$ to the tube $10^b$ and at its lower portion receives the body $17^a$ of the axle which is secured by a transverse bolt $18^a$. A turnable spindle $19^a$ is secured by a pin 23, the character $19^b$ indicating conventionally a known form of steering arm on said spindle.

The pneumatic tube 10 or $10^b$, it is to be understood, is made very strong after the manner of the fire hose to have stability aside from the inflation of the tube, the arrangement being such that the tube presents arms extending from the axle receiving means to the connection with the frame remote from the axle, said arms forming the connecting medium between the axle and frame and forming spring suspension arms for the frame, as distinguished from mere pneumatic cushions on which the frames might seat.

A characteristic to be noted with respect to the described suspension means is that the action is comparatively uniform determined by the pressure in the pneumatic tube, the mode of functioning being distinguished from a pronounced increase and decrease in the pressure and reaction in cases where a spring or pneumatic cushion is compressed by the relative movements of the body and axle.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim:

1. In a suspension means for vehicles, a spring in the form of a pneumatic tube, means to rigidly secure and support said tube at its ends on a vehicle frame, and means on said tube to receive an axle, said tube forming bendable suspension arms between the axle and the frame.

2. A pneumatic suspension spring for vehicles in the form of a pneumatic tube adapted to constitute a bendable connecting medium between the frame and the axle, end supporting means for said spring tube adapted to be secured to a vehicle frame, and means on said tube, between said end supporting means to secure the same to an axle, said tube between the axle and frame connection being in the form of bendable suspension arms for the frame.

3. In a suspension means, a vehicle, a spring consisting of a flexible pneumatic tube, supporting hangers for the tube adapted to be secured to a vehicle frame, means on said hangers engaging said spring tube at its ends, and means clamped to said tube between its ends to afford connection between the spring and an axle, the said tube between the hangers and said clamped means being unsupported.

4. A pneumatic spring suspension in the form of a pneumatic tube adapted to connect with an axle and having means to immovably tie it to a vehicle frame distant from the axle, to constitute a connecting medium therebetween and to constitute a spring suspension for the frame.

5. In a suspension means for vehicles, a spring in the form of an elliptical pneumatic tube having its minor axis vertical, rollers about which said spring extends at its ends, means to support said rollers on a vehicle frame, and an axle mount secured to both the top and bottom tubular members of the spring.

6. In a suspension means for vehicles, a spring in the form of an elliptical pneumatic tube having its minor axis vertical, rollers about which said spring extends, at its ends, means to support said rollers on a vehicle frame, and an axle mount secured to both the top and bottom tubular members of the spring; together with a brace pivoted to the means mounting one of said rollers, said brace being secured at its opposite end to said axle mount.

7. A pneumatic spring suspension for vehicles, in the form of an elliptical pneumatic tube, end supports for said spring suspension tube adapted to be mounted on a vehicle frame, an axle mount connecting the opposite tubular sides of said spring, and a brace secured at one end to said axle mount and means to which said brace is pivotally secured at its other end to rock vertically with the yielding of the axle mount and spring, said means being adapted to be rigidly secured to the vehicle frame.

JOHN O'CONNOR.